US012687415B2

(12) United States Patent
Zhu

(10) Patent No.: US 12,687,415 B2
(45) Date of Patent: Jul. 21, 2026

(54) MEASURING DEVICE

(71) Applicant: Endress+Hauser Flowtec AG, Reinach (CH)

(72) Inventor: Hao Zhu, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 320 days.

(21) Appl. No.: 18/547,798

(22) PCT Filed: Jan. 27, 2022

(86) PCT No.: PCT/EP2022/051855
§ 371 (c)(1),
(2) Date: Aug. 24, 2023

(87) PCT Pub. No.: WO2022/179791
PCT Pub. Date: Sep. 1, 2022

(65) Prior Publication Data
US 2024/0142286 A1    May 2, 2024

(30) Foreign Application Priority Data

Feb. 26, 2021    (DE) ..................... 10 2021 104 631.9

(51) Int. Cl.
*G01F 15/18*        (2006.01)
*G01F 1/58*         (2006.01)
(Continued)

(52) U.S. Cl.
CPC .............. *G01F 15/185* (2013.01); *G01F 1/58* (2013.01); *G01F 1/662* (2013.01); *G01F 1/8418* (2013.01)

(58) Field of Classification Search
CPC .......... G01F 1/58; G01F 1/662; G01F 1/8418; G01F 15/185
(Continued)

(56) References Cited

U.S. PATENT DOCUMENTS 6,343,517 B1 *  2/2002  Van Cleve ............ G01F 1/8418
                                                        73/861.357
2001/0006007 A1 *  7/2001  Davies .................. G01F 1/8409
                                                        73/861.357
(Continued)

FOREIGN PATENT DOCUMENTS

CN        103052868 A1    4/2013
CN        103562689 A1    2/2014
(Continued)

OTHER PUBLICATIONS

Compensator (Pipe), Online article, https://de.wikipedia.org/wiki/Kompensator_(Rohr), page last edited Sep. 10, 2020, Germany (last accessed Nov. 23, 2021).

*Primary Examiner* — Nathaniel T Woodward
(74) *Attorney, Agent, or Firm* — Christopher R. Powers; Endress+Hauser (USA) Holding, Inc.

(57) ABSTRACT

A measuring device includes a measuring transducer, which includes a protection housing, two connection connectors, and a fluid line, which extends from a first end to a second end, wherein the first and second ends of the fluid line are each connected to one of the connection connectors, respectively, and wherein at least one of the connection connectors includes a metal compensator in a region located between a first connector end and a second connector end, which second end forms an end of the protection housing adjacent the first and/or second end of the fluid line.

25 Claims, 2 Drawing Sheets

(51) Int. Cl.
    *G01F 1/66*        (2022.01)
    *G01F 1/84*        (2006.01)

(58) Field of Classification Search
    USPC .......................................................... 73/201
    See application file for complete search history.

(56)                    References Cited

U.S. PATENT DOCUMENTS

| | | |
|---|---|---|
| 2007/0044575 A1 | 3/2007 | Kassubek et al. |
| 2008/0223149 A1 | 9/2008 | Rieder et al. |
| 2010/0236338 A1 | 9/2010 | Bitto et al. |
| 2012/0279317 A1 | 11/2012 | Bitto et al. |
| 2015/0001846 A1* | 1/2015 | Griffin .................... F16L 23/02 |
| | | 285/368 |
| 2017/0115142 A1* | 4/2017 | Weinstein ............. G01F 1/8468 |
| 2017/0261474 A1 | 9/2017 | Zhu et al. |

FOREIGN PATENT DOCUMENTS

| | | |
|---|---|---|
| CN | 109154518 A1 | 1/2019 |
| CN | 110114641 A1 | 8/2019 |
| CN | 111492210 A1 | 8/2020 |
| DE | 10137921 A1 | 2/2003 |
| DE | 102015220629 A1 | 4/2017 |
| EP | 0253504 A1 | 1/1988 |
| EP | 0759542 A1 | 2/1997 |
| EP | 1427998 A1 | 6/2004 |
| WO | WO-9608697 A2 * | 3/1996 ........... G01F 1/8427 |

* cited by examiner

MEASURING DEVICE

CROSS-REFERENCE TO RELATED APPLICATIONS

The present application is related to and claims the priority benefit of German Patent Application No. 10 2021 104 631.9, filed Feb. 26, 2021, and International Patent Application No. PCT/EP2022/051855, filed Jan. 27, 2022, the entire contents of which are incorporated herein by reference.

TECHNICAL FIELD

The invention relates to a measuring device for measuring at least one measurement variable of a fluid measured substance.

BACKGROUND

Such devices are known from EP-A 18 92 30, U.S. Pat. No. 5,287,754, US-A 2010/0236338, US-A 2010/0257943, US-A 2011/0265580, US-A 2012/0279317, US-A 2017/0219398, US-A 2017/0261474, US-A 2017/0356777, US-A 2018/0087946, U.S. Pat. Nos. 4,655,089, 5,549,009, WO-A 2020/126285, WO-A 2020/239319, WO-A 02/052230, WO-A 96/08697 or WO-A 98/38479, wherein each measuring device is formed by means of, in each case, a measuring transducer used to generate at least one measurement signal corresponding to the at least one measurement variable, for example, a vibronic or magnetic inductive or acoustic measuring transducer, and a measuring device electronic unit electrically connected to the respective measuring transducer that is used to process the at least one measurement signal. Such measuring devices can also be used, inter alia, to determine measured values for at least one measurement variable—in particular specifically a mass flow rate, a volumetric flow rate, a density, a viscosity, a pressure or a temperature—of a fluid measured substance, for example, a liquid, a gas or a dispersion, that is flowing and/or conducted in a pipe or a piping system.

Each of the measuring transducers comprises in each case at least one fluid line—formed here as a rigid and/or at least in some parts circular cylindrical tube—a first connection connector—typically rotationally symmetrical with respect to an (imaginary) longitudinal axis—and a second connection connector—typically rotationally symmetrical with respect to the first connection connector and/or with respect to an (imaginary) longitudinal axis.

The fluid line of each of the aforementioned measuring transducers has a lumen encased by a wall, in particular made of metal, and extending from a first flow opening located in a first line end of the fluid line to a second flow opening located in a second line end of said fluid line and each of the two connection connectors has in each case a first flow opening encased by a wall, in particular made of metal, and extending from a first flow opening—typically framed by a (standardized) connecting flange—located in a respective first connector end of the respective connection connector up to a second flow opening located in a second connector end of said connection connector, for example, a lumen which is rotationally symmetric with respect to an (imaginary) longitudinal axis of the first connection connector. In addition, the fluid line is connected both at its first line end to the second line end of the first connection connector and at the second line end thereof to the second line end of the second connection connector, such that the lumen of the fluid line communicates with the lumen of the first connection connector as well as the lumen of the second connection connector to form an extending fluid duct, or that the first flow opening of the fluid line opens into the second flow opening of the second connection connector and the second flow opening of the first fluid line opens into the second flow opening of the second connection connector. The first fluid line can, for example, be connected in a bonded manner to each of the two connection connectors. Furthermore, the first fluid line can also be curved at least in sections, for example, in a V-shape and/or a U-shape and/or a circular arc shape. Furthermore, the measuring transducer can comprise at least one second fluid line, which is typically structurally identical to the first fluid line, wherein for this case the first and second fluid lines can, in addition, each be connected at their respective first line ends to the second line end of the first connection connector—then formed, for example as a line branch—and at the respective second line end thereof in each case to the second line end of the second connection connector—then formed, for example, as a line merger.

Each of the measuring transducers further comprises a (transducer) protection housing for the respective one or more fluid lines. The protection housing includes in each case a cavity encased by a wall, typically made of a metal, within which cavity each of the fluid lines is placed. In addition, a respective first or second housing end of the protection housing is formed by means of one of the connection connectors, such that the protection housing has a side wall laterally bounding the cavity at least in part, said side wall being connected in a fixed and bonded manner laterally not only at the second line end of the first connection connector but also at the second line end of the second connection connector. The connection connector and the protection housing can accordingly also be an integral component, for example, one and the same structural unit, of the measuring transducer.

As shown in EP-A 18 92 30, U.S. Pat. No. 5,287,754, US-A 2010/0257943, US-A 2017/0219398, US-A 2017/0261474, US-A 2017/0356777, U.S. Pat. Nos. 4,655,089, 5,549,009, WO-A 2020/126285, WO-A 2020/239319, WO-A 02/052230, WO-A 96/08697 and WO-A 98/38479, which were mentioned at the outset, the fluid lines of the respective measuring transducers can each be configured to allow the measured substance to flow through and to be allowed to vibrate during this process. Accordingly, the measuring transducer can further comprise at least one electromechanical vibration exciter electrically connected to the measuring device electronics for exciting or maintaining mechanical vibrations, for example said flexural vibrations, of each of the fluid lines of the measuring transducer, which is configured to convert electrical power fed by means of an electrical excitation signal generated by the measuring device electronics into mechanical power which brings about mechanical vibrations of at least one fluid line. In order to detect vibrations of the fluid lines and to generate at least one typically electrical measurement signal corresponding to one or more measurement variables of the measured substance guided in the fluid line, each of the aforementioned measuring transducers comprises one or more sensors, typically each mounted on the at least one fluid line and/or positioned at least in the vicinity thereof. In addition, the measuring device electronics are electrically connected to each of the sensors, for example electrodynamic or optoelectrical sensors, and are configured to process the respectively delivered measurement signals, for example, to determine said measured values for the at least one measurement variable by means of one or more measurement signals.

Each of the aforementioned measuring transducers is additionally provided and configured to be integrated into a piping system to form a corresponding (process) measuring point, in particular in such a way that the first connector end of the first connection connector is fluidically connected to a pipe end of a first straight pipe segment of the piping system, which pipe end faces the measuring transducer, typically framed by a connection flange that is standardized or fits the connection flange of the first connection connector, and in such a way that the first connector end of the second connection connector is fluidically connected to a pipe end of a straight second pipe segment of the piping system aligned with the first pipe segment and typically framed by a connection flange facing the measuring transducer and framed by a connection flange that is standardized or fits the connection flange of the second connection connector in particular to specifically form a fluid duct extending from the first pipe segment to the second pipe segment. For this purpose, the first and second connection connectors are typically arranged and aligned in the aforementioned measuring transducers such that they are aligned with one another in such a way that an extension of a longitudinal axis of the first connection connector coincides with an extension of a longitudinal axis of the second connection connector.

Investigations on measuring points of the type described above have shown that the first and second pipe segments, which are typically installed so as to be stationary or immovable, can occasionally be offset to a considerable degree with respect to one another in such a way that, due to such a offset, they are not aligned with one another or that the longitudinal axes of the two pipe segments are not coincident with one another, for example, in fact, are displaced parallel to one another or are even mutually oblique, and/or in such a way that a (clear) distance between first and second pipe segments that corresponds to an installation length of the measuring transducer deviates from a distance specified therefor. As a result, undesired mechanical stresses in the measuring transducer or forces producing corresponding (static) deformations or moments, in particular said (tensile) forces acting in the direction of the longitudinal axis of the first or second connection connector and/or (transverse) forces acting transverse to the longitudinal axis or corresponding bending moments can be introduced into the measuring transducer; this normally happens also in such a way that the at least one fluid line reacts to a (tensile) force acting from the outside in the direction of the longitudinal axis of the first or second connection connector with a (longitudinal) expansion that is greater than a (longitudinal) expansion that is permissible for said fluid line and/or that the at least one fluid line reacts to a (transverse) force acting transversely to the longitudinal axis of the first or second connection connector with a curvature that is greater than a curvature that is permissible for said fluid line. In this way, a measurement accuracy with which the respective measuring device determines the measured values for at least one measurement variable can also be reduced to a considerable extent, in particular even in such a way that the respective measuring device cannot deliver the specified measurement accuracy.

SUMMARY

Proceeding from this, it is an object of the invention to improve measuring devices of the type in question in such a way that a possible offset between pipe segments of a respective piping system to be connected to the measuring transducer or associated (deformation) forces which are introduced into the measuring transducer from the outside via connection ports do not result in impermissibly high impairments of the measuring accuracy of the respective measuring device.

In order to achieve the object, the invention consists of a measuring device for measuring at least one measurement variable of a fluid measured substance, which is guided for example in a pipe, the measuring device comprising:

a measuring transducer used to generate at least on measurement signal corresponding to the at least one measurement variable, for example a vibronic or magnetic-inductive or acoustic, measuring transducer;

and measuring device electronics electrically connected to the measuring transducer and used for processing the at least one measurement signal;

wherein the measuring transducer comprises a (transducer) protection housing, a first connection connector, designed for example as a line branch and/or rotationally symmetrical with respect to an (imaginary) longitudinal axis, having a first flow opening, which extends from a first flow opening encased by a metal wall and located in a first connector end of the first connection connector that is framed, for example, by a connection flange to a second flow opening located in a second connector end of said first connection connector, for example a lumen rotationally symmetrical with respect to an (imaginary) longitudinal axis of the first connector connection, a second connection connector, structurally identical, for example, to the first connection connector and/or serving as a line combining and/or being rotationally symmetrical with respect to a (imaginary) longitudinal axis, encased by a wall, for example made of a metal, extending from a first flow opening located in a first connector end of the second connection connector, for example a connection flange, to a second flow opening located in a second connector end of said second connection connector, for example with respect to an (imaginary) longitudinal axis of the second connection connector rotationally symmetrical, and a first fluid line, for example formed as a rigid and/or at least partially circular cylindrical tube, comprising a lumen that is encased by a wall, for example made of metal, and extends from a first flow opening located in a first line end of the first fluid line to a second flow opening located in a second line end of said first fluid line;

wherein the first fluid line is connected both with its first line end to the second line end of the first connection connector and with its second line end to the second line end of the second connection connector, for example in a material-to-material manner, for example in such a way that the lumen of the first fluid line communicates with both the lumen of the first connection connector and the lumen of the second connection connector while forming a fluid duct extending from the first connection connector to the second connection connector and/or in such a way that the first flow opening of the first fluid line opens into the second flow opening of the second connection connector and the second flow opening of the first fluid line opens into the second flow opening of the second connection connector;

wherein said (transducer) protection housing comprises a cavity encased by a wall, for example made of a metal, within which the first fluid line is placed;

wherein a first housing end of the protection housing is formed by means of the first connection connector (100) and a second housing end of the (transducer) protection housing is formed by means of the second connection connector such that the protection housing has a side wall laterally bounding the cavity, at least in part, which is connected in a fixed manner both at the second line end of the first connection connector and also at the second line end of the second connection connector or is connected in a bonded manner therewith in each case.

In the case of the measuring device according to the invention, at least the first connection connector additionally has, in a region located between its first connector end and its second connector end, which forms the first housing end, and is, for example, specifically remote from its first connector end and/or from the first housing end, a metal compensator for example, such that the first connection connector reacts to a (tensile) force in the region of the metal compensator with a (longitudinal) extension which is greater than a (longitudinal) extension with which the first connection connector reacts in the region of the first connector end and/or in the region of the second connector end to said (tensile) force, and/or that the first connection connector reacts to a (tensile) force in the region of the metal compensator acting transversally to the longitudinal axis that brings about a, for example, straight, (transverse force) bending of the first connection connector with a curvature that is greater than a curvature with which the first connection connector reacts to said (transverse) force in the region of the first connector end and/or in the region of the second connector end.

Moreover, the invention further also consists of using such a device for determining measured values for at least one measurement variable—for example specifically of a mass flow rate, a mass flow, a volumetric flow rate, a volumetric flow rate, a density, a viscosity or a temperature—of a fluid measured substance guided in a pipe, for example a gas, a liquid or a dispersion, for example also such that the first connection connector is arranged on the inlet side with respect to a flow direction of the measured substance which flows through the measuring transducer and/or that the measured substance is allowed to flow in a predetermined flow direction through the pipe and the measuring transducer incorporated in said pipe.

According to a first embodiment of the invention, it is further provided that the first connection connector is configured to react to a (tensile) force acting in the direction of a longitudinal axis of the first connection connector in the region of the metal compensator with a (longitudinal) extension which is greater than a (longitudinal) extension with which the connection connector reacts to said (tensile) force in the region of the first connector end and/or in the region of the second connector end.

According to a second embodiment of the invention, it is further provided that the first connection connector is configured to react to a (transverse) force in the region of the metal compensator acting transverse to the longitudinal axis that brings about a (transverse force) bending of the first connection connector, that is for example straight, with a curvature that is greater than a curvature with which the first connection connector reacts to said (transverse) force in the region of the first connector end and/or in the region of the second connector end.

According to a third embodiment of the invention, it is further provided that the metal compensator has at least one recess running for example along a circular and/or self-enclosed circumferential line, for example formed as a bead and/or self-enclosed.

According to a fourth embodiment of the invention, it is further provided that the metal compensator is formed by at least one recess in the wall of the first connection connector, which recess runs for example along a circular and/or self-enclosed circumferential line, for example formed as a bead and/or self-enclosed.

According to a fifth embodiment of the invention, it is further provided that the metal compensator has an integral component of the first connection connector, for example by the wall of the first connection connector having at least one recess running for example along a circular and/or self-enclosed circumferential line, for example formed as a bead and/or self-enclosed.

According to a sixth embodiment of the invention, it is further provided that the wall of the first connection connector for forming the metal compensator has at least one recess running for example along a circular and/or self-enclosed circumferential line, for example formed as a bead and/or self-enclosed and/or is formed in sections as a metal bellows. This embodiment of the invention in a further development further provides that the wall of the first connection connector has two or more recesses, which are arranged one behind the other in the flow direction, for example of the same shape, and/or that the wall of the first connection connector is corrugated at least in sections and/or in that the first connection connector has an internal diameter varying in a corrugated manner in the direction of the longitudinal axis and an outer diameter equivalently varying in a corrugated manner.

According to a seventh embodiment of the invention, it is further provided that the metal compensator of the first connection connector is formed as a corrugated tube compensator.

According to an eighth embodiment of the invention, it is further provided that the metal compensator of the first connection connector is formed as a lens compensator.

According to a ninth embodiment of the invention, it is further provided that the metal compensator of the first connection connector is formed as an axial compensator.

According to a tenth embodiment of the invention, it is further provided that the second connection connector has—in a region located between its first connector ends and its second connector ends forming the first housing end, for example specifically remote from its first connector end and/or the first housing end—a metal compensator, for example integrated and/or formed as an axial compensator, for example such that the metal compensator is an integral component of the first connection connector and/or is structurally identical to the metal compensator of the first connection connector. Alternatively, the measuring transducer or the measuring device formed therewith can also be configured such that the second connection connector does not have a metal compensator.

According to an eleventh embodiment of the invention, it is further provided that the measuring transducer is configured to be integrated in a piping system, for example in such a way that the second connector end of the first connection connector is connected to a pipe end of a first pipe segment of the piping system facing the measuring transducer and/or that the second connector end of the second connection connector is fluidically connected to a pipe end of a second pipe segment of the piping system facing the measuring transducer, for example to form a fluid duct that extends from the first pipe segment to the second pipe segment and/or is leakage-free.

According to a twelfth embodiment of the invention, it is further provided that the first and second connection connectors are aligned with one another, for example in such a way that an extension of a longitudinal axis of the first connection connector is parallel to or coincides with an extension of a longitudinal axis of the second connection connector.

In a thirteenth embodiment of the invention, it is further provided that the measured substance is designed to flow through the first fluid line and during this allowed to vibrate.

In a fourteenth embodiment of the invention, it is further provided that the first fluid line is curved at least in sections, for example V-shaped and/or U-shaped and/or circular arc-shaped.

According to a fifteenth embodiment of the invention, it is further provided that the first fluid line is straight at least in sections, for example specifically in the shape of a hollow cylinder.

In a sixteenth embodiment of the invention, it is further provided that the measuring device electronics are configured to feed an electrical driver signal into the measuring transducer.

According to a first further development of the invention, the measuring device further comprises at least one second fluid line, which is designed, for example, as a rigid and/or at least partially circular cylindrical tube and/or is structurally identical to the first fluid line, having a lumen that is encased by a wall made of metal and extends from a first flow opening located in a first connector end of the second fluid line to a second flow opening located in a second line end of said second fluid line wherein the second fluid line is connected at the first line end thereof to the second line end of the first connection connector and at its second line end to the second line end of the second connection connector, for example in such a way that both the lumen of the first fluid line and the lumen of the second fluid line communicate with the lumen of the first fluid line and/or in such a way that the first flow opening of the second fluid line opens into the second flow opening of the first fluid line and the first flow opening of the third fluid line opens into the third flow opening of the first fluid line. Furthermore, the second fluid line can also be configured for the measured substance to flow through said second fluid line, for example and simultaneously with the first fluid line, be allowed to vibrate during this.

According to a second further embodiment of the invention, the measuring device further comprises at least one, for example electromechanical or electrodynamic, vibration exciter for exciting or maintaining mechanical vibrations, for example bending vibrations, at least of the first fluid line, for example also for exciting or maintaining mechanical vibrations both of the first fluid line and of a second fluid line. For this purpose, the measuring device electronics can also be electrically coupled to the vibration exciter, for example in order to feed electrical power into the vibration exciter by means of an electric driver signal, or the vibration exciter can also be configured to convert electrical power fed from the measuring device electronics, for example by means of an electric driver signal, into mechanical power which brings about mechanical vibrations of at least the first fluid line.

According to a third development of the invention, the measuring device further comprises at least one first sensor, which is mounted, for example, at least on the first fluid line and/or is placed at least in the vicinity thereof, for generating at least one first measurement signal, for example an electrical signal, having a signal parameter which corresponds to a measurement variable of a fluid guided in the fluid line system. In addition, the measuring device electronics can be electrically coupled to the first sensor and therefore configured to process the at least first measurement signal, for example to determine said measured values for the at least one measurement variable by means of the first measurement signal.

According to a fourth further development of the invention, the measuring device further comprises at least one first sensor, which is mounted, for example, at least on the first fluid line and/or is placed at least in the vicinity thereof, for generating at least one first measurement signal, for example an electrical signal, having a signal parameter which corresponds to a measurement variable of a fluid guided in the fluid line system, and at least one second sensor, which is arranged for example at least on the first fluid line and/or is placed at least in the vicinity thereof and/or structurally identical to the first sensor for generating at least one, for example electrical, second measurement signal corresponding to the measurement variable. In addition, the measuring device electronics can be electrically coupled both to the first sensor and also to the second sensor and therefore can be configured to process the first and second measurement signals, for example to determine said measured values for the at least one measurement variable by means of the first and second measurement signal.

A basic idea of the present invention consists on the one hand of keeping any said (deformation) forces introduced by the connected piping system from outside via connection connector into the measuring transducer of the respective measuring device away from the at least one fluid line of the measuring transducer or the at least one fluid line and the surrounding (transducer) protection housing by means of the at least one metal compensator by the mechanical stresses resulting from the (deformation) forces within at least one of the two connection connectors being reduced such that both the fluid line and the (transducer) protection housing do not undergo any deformations, or undergo only negligibly small ones, and on the other hand nevertheless ensuring an otherwise high mechanical stability of the connection connector and the measuring transducer overall.

The invention is also based, inter alia, on the surprising finding that although the use of one or more connection connectors with in each case one metal compensator might initially result in a greater effort in the production of the measuring transducer, and beyond that even in an adverse effect on the flow properties of the measuring transducer, including its flow resistance, the integration of the at least one metal compensator into the measuring transducer and the consideration thereof during calibration of the measuring transducer can ultimately result in a significantly improved measurement accuracy compensating for the aforementioned disadvantages even with offset pipe segments.

The invention as well as advantageous embodiments thereof are explained in more detail below based upon exemplary embodiments shown in the figures of the drawing. Identical or identically acting or identically functioning parts are provided with the same reference signs in all figures; for reasons of clarity or if it appears sensible for other reasons, reference signs mentioned before are dispensed with in subsequent figures. Further advantageous embodiments or developments, especially, combinations of partial aspects of the invention that were initially explained only separately, furthermore emerge from the figures of the drawing and/or from the claims themselves.

DETAILED DESCRIPTION

Figure 1:
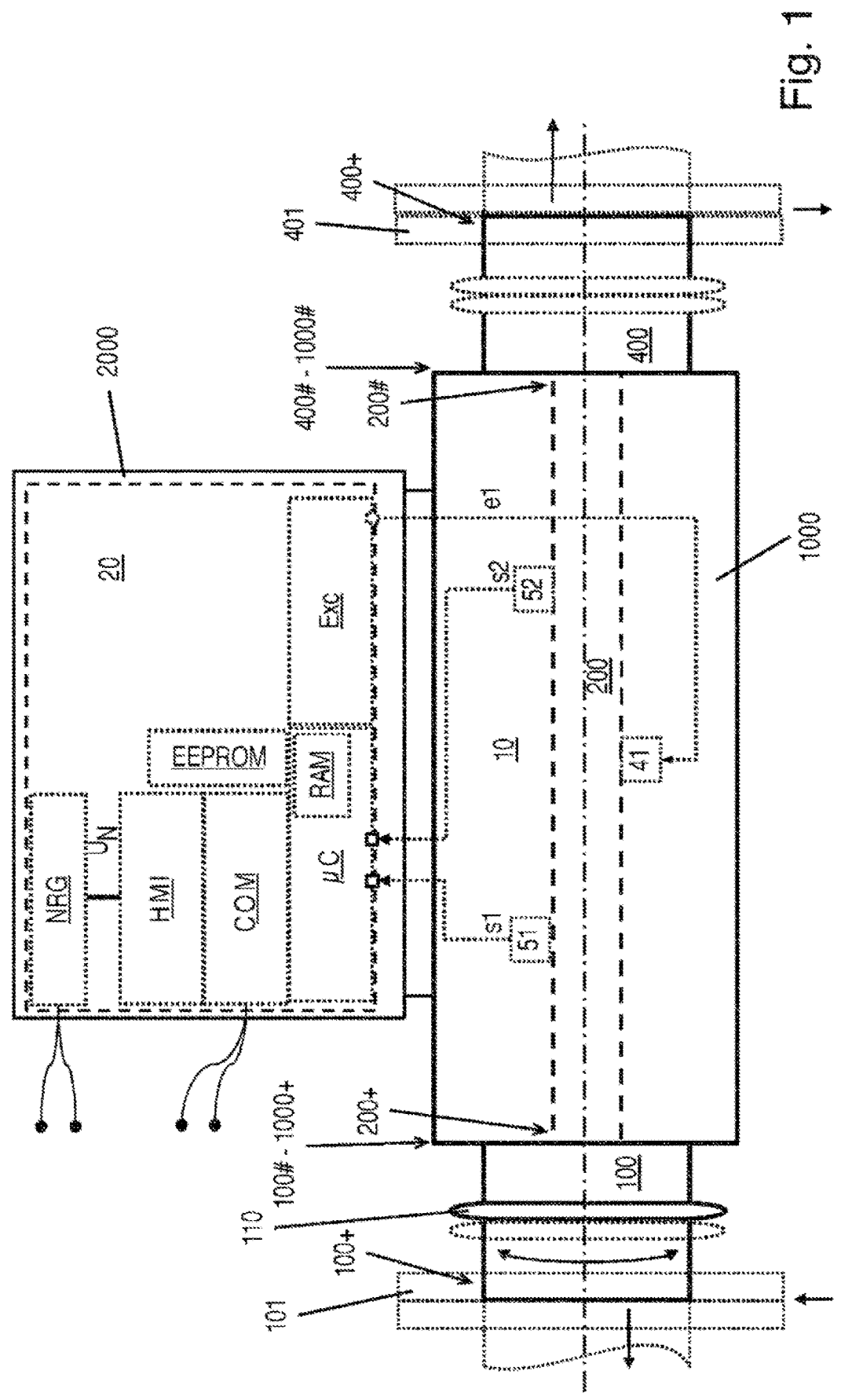
FIG. 1 schematically shows an exemplary embodiment of a measuring device according to the present disclosure.
Figure 2:
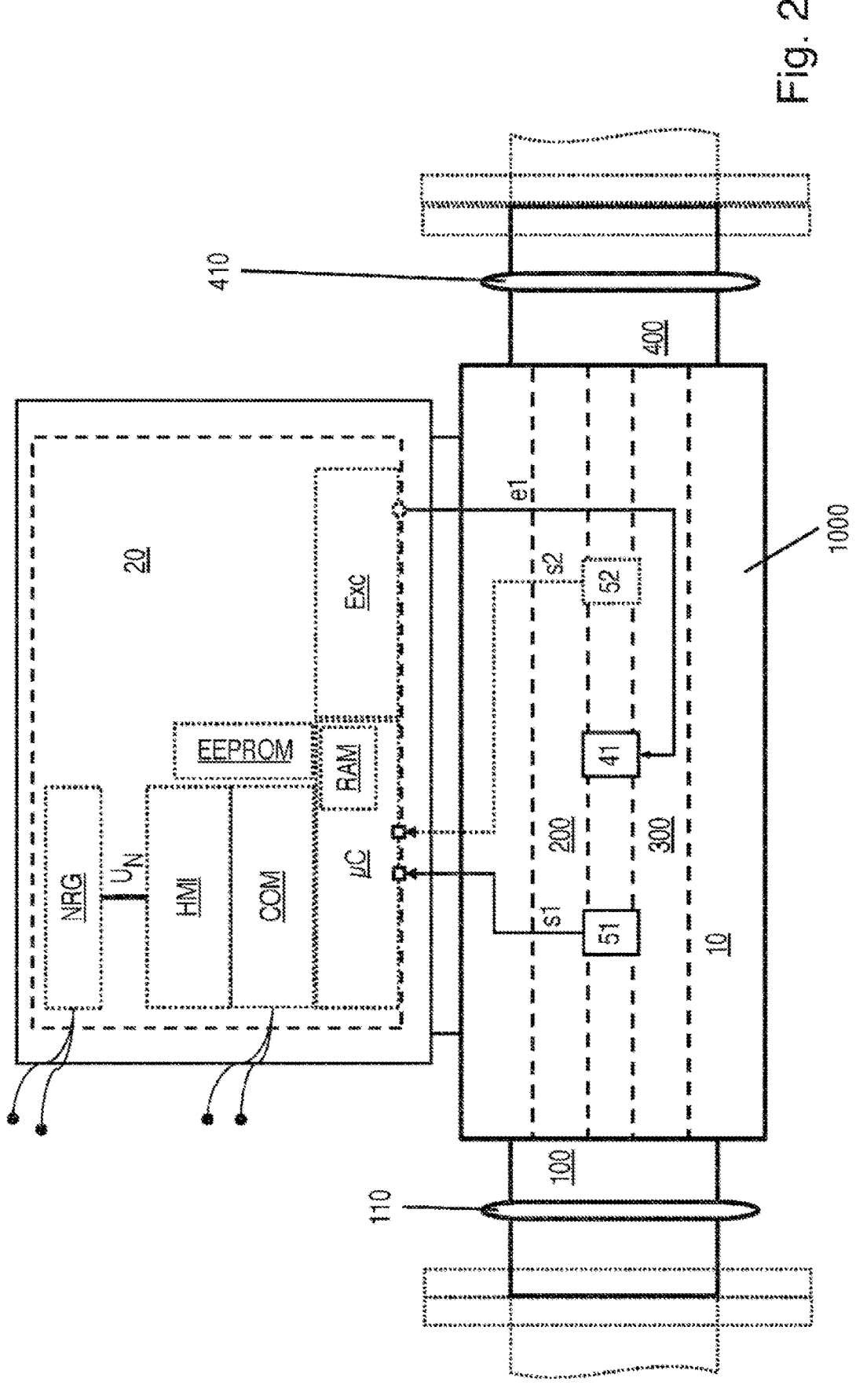
FIG. 2 schematically shows a further variant for a measuring device according to the present disclosure.

In FIGS. 1 and 2, a measuring device or different design variants of such a measuring device, in some cases also complementary to one another, are shown schematically, which design variants are provided in particular for determining measured values for at least one measurement variable—for example specifically a mass flow rate, a mass flow, a volumetric flow rate, a volumetric flow, a density, a viscosity or a temperature—of a fluid measured substance conducted in a pipe, for example, specifically a gas, a liquid or a dispersion. The measuring device comprises a measuring transducer 10—in particular a vibronic or magnetic-inductive or acoustic one—which can be used to generate at least one measurement signal s1 (s1, s2) that corresponds to the at least one measurement variable, and in particular has the said at least one signal parameter which is dependent on the measured value and/or is electrical, and a measuring device electronic unit 20 which is electrically connected to the measuring transducer and can be used to process the at least one measurement signal s1 (s1, s2). As is quite usual in the case of measuring devices of the type in question, the measuring device electronics 20 can also be accommodated in an electronics protection housing 2000 that is, for example, metallic and/or explosion-resistant and/or seals against spray water and/or dust.

The measuring transducer 10 comprises at least one fluid line 200—formed for example as a rigid and/or at least in some parts circular cylindrical tube—a first connection connector 100—for example, rotationally symmetrical with respect to an (imaginary) longitudinal axis—and a second connection connector—typically rotationally symmetrical with respect to the first connection connector 400 and/or with respect to an (imaginary) longitudinal axis.

The fluid line 200 of the measuring transducer 10 has a lumen encased by a wall, for example made of metal, such as a stainless (noble) steel, a titanium alloy, a tantalum alloy, a zirconium alloy, etc. and extending from a first flow opening located in a first line end of the fluid line 200 to a second flow opening located in a second line end of said fluid line and each of the two connection connectors 100, 400 has in each case a respective first flow opening encased by a wall, in particular made of metal, for example a rustproof (stainless) steel, and extending from a first flow opening—typically framed by a (standardized) connecting flange (101, 401)—located in a respective first connector end 100+ or 400+ of the respective connection connector 100, 400 to a second flow opening located in a second connector end 100 # or 400 # of said connection connector 100, 400, for example a lumen which is rotationally symmetric with respect to an (imaginary) longitudinal axis of the respective connection connector 100 or 400. Moreover, the fluid line 200 is connected both at its first line end 200+ to the second line end 100 # of the first connection connector 100 and at the second line end 200 # thereof to the second line end 400 # of the second connection connector 400, in particular in such a way that the lumen of the fluid line 200 communicates with both the lumen of the first connection connector 100 and the lumen of the second connection connector 200 while forming a fluid duct extending consistently from the connection connector 100 to the connection connector 400, or that the flow opening of the fluid line 100 opens into the second flow opening of the connection connector 200 and the second flow opening of the fluid line 200 opens into the second flow opening of the second connection connector 400.

The fluid line 200 can, for example, be connected in a bonded manner to each of the two connection connectors. Furthermore, the fluid line 200 can also be designed at least partially straight, for example, specifically hollow-cylindrical, and/or at least in some sections curved, for example specifically in a V-shape and/or U-shape and/or a circular arc shape. Furthermore, the measuring transducer, as also indicated in FIG. 2, may comprise at least one second fluid line 300, which is, for example, structurally identical to the fluid line 200, wherein, in this case, the at least two fluid lines 200, 300 can in addition each be connected at the respective first line ends 200+, 300+ thereof to the second line end 100 # of the connection connector 100—then formed, for example, as a line branch—and at its respective second line ends 200 #, 300 # in each case to the second line end 400 # of the connection connector 400—then formed, for example, as a line merger—this being done in particular in such a way that both the fluid line 200 at its first line end 200+ and the fluid line 300 at its first line end 300+ are each connected to the second line end 100 # of the connection connector 100 and both the fluid line 200 at its second line end 200 # and the fluid line 300 at its second line end 300 # are each connected to the second line end 400 # of the connection connector 400, or in such a way that both the lumen of the fluid line 200 and the lumen of the fluid line 300 communicate with the lumen of the connection connector 100 and/or in such a way that the first flow opening of the fluid line 200 opens into the second flow opening of the connection connector 100 and the first flow opening of the fluid line 300 opens into the second flow opening of the connection connector 100, likewise located in the line end 100 #, and the second flow opening of the fluid line 200 opens into the second flow opening of the connection connector 400 and the second flow opening of the fluid line 300 opens into a third flow opening of the connection connector 400, likewise located in the line end 400 #. Furthermore, the measuring transducer, if necessary, can have further fluid lines connected to the connection connectors and accommodated inside the protection housing 1000, for example, specifically as shown in the aforementioned US-A 2010/0236338 or US-A 2017/0261474, respectively, four parallel and at least pairwise identical fluid lines or, as proposed in US-A 2012/0279317, mentioned at the outset, eight or more fluid lines.

In order to generate the at least one measurement signal s1, the measuring device according to a further embodiment of the invention comprises at least one first sensor 1000, which is for example mounted at least in part on the at least one fluid line 100 and/or placed at least in its vicinity. In order to process the measurement signal s1, for example, specifically to determine measured values for the at least one measurement variable on the basis of the measurement signal s1, the measuring device electronics can also be electrically coupled to the sensor 51.

According to a further embodiment of the invention, the measuring transducer is designed as a vibration-type measuring transducer in such a way that the measured substance is configured to flow through at least one of its fluid lines, in particular each of its fluid lines, to have it vibrate during this; for the above-described case that two or more fluid lines are provided, for example also simultaneously. For exciting or maintaining mechanical vibrations, for example said bending vibrations, at least of the fluid line 200, in some cases also for exciting or maintaining mechanical vibrations both of the fluid line 200 and of the fluid line 300, the measuring transducer or the measuring device formed therewith further comprises at least one (electromechanical), for example, said electrodynamic or electromagnetic vibration exciter 41. The vibration exciter 41 is electrically connected to the measuring device electronics and, in particular, is additionally configured to convert electrical power fed from the measuring device electronics, for example, specifically by means of a corresponding electrical driver signal e1 of the measuring device electronics, into mechanical power which creating mechanical vibrations of at least the fluid line 200, this being provided for the above-described case that two fluid lines (200, 300) are provided, for example also in such a way that the two fluid lines (200, 300) carry out opposing (flexural) vibrations. In particular for the above-described case in which the measuring transducer 10 is designed as a measuring transducer of the vibration type, the sensor 51 can also be designed as, for example, an electrodynamic or optoelectrical vibration sensor. Alternatively or in addition, the measuring transducer 10 may also be equipped with at least one second (vibration) sensor 52, which is, for example, attached to and/or placed at least close to the fluid line 200 and/or is structurally identical to the aforementioned sensor 51, for generating at least one second, in particular electrical, measurement signal s2, which also corresponds to the at least one measurement variable. In addition, the measuring device electronics 20 can also be electrically coupled to the sensor 52, for example similarly to the sensor 51, and can also be configured to process the measurement signal s2 thereof, in particular to determine, by means of the first and second measurement signal s1, s2, measured values for the at least one measurement variable, for example specifically to calculate measured values for the mass flow rate or the mass flow on the basis of a phase difference established between the measurement signals.

The measuring transducer 10 of the measuring device according to the invention further comprises a (transducer) protection housing 1000 with a cavity encased by a wall, for example made of a metal, in particular a rustproof (stainless) steel, within which the at least one fluid line 200 or each of the fluid lines of the measuring transducer is placed. In addition, a first housing end 1000+ of the protection housing 1000 is formed by means of the connection connector 100 and a second housing end 1000 # of the protection housing 1000 by means of the connection connector 400, such that the protection housing 1000 has a side wall laterally bounding its pre-designated cavity, at least in part, said side wall laterally being connected in a fixed and bonded manner both at the second line end 100 # of the connection connector 100 and also at the second line end 400 # of the connection connector 400. The transducer protection housing 1000 can also, for example, be mechanically fixedly connected to the pre-designated electronics protection housing for the measuring system electronics to form a measuring device of compact construction, in such a way that the electronics protection housing 2000 is held directly and/or only by the transducer protection housing.

As already mentioned, the measuring transducer is in particular provided or configured to be integrated into a (pipe) system comprising the aforementioned pipe, for example specifically in such a way that the connector end 100+ of the connection connector 100 is fluidically connected at a pipe end of a first pipe segment of the piping system that faces the measuring transducer 10 and/or that the connector end 400+ of the connection connector 400 is fluidically connected, to a pipe end of a second pipe segment of the piping system that faces the measuring transducer, in particular also in a leakage-free manner, for example specifically to form a fluid duct extending continuously from the aforementioned first pipe segment to the aforementioned second pipe segment and/or in such a way that the measured substance (during operation) is allowed to flow in a predetermined flow direction through the pipe and the measuring transducer incorporated therein. According to a further embodiment of the invention, the connection connectors 100, 400 are accordingly arranged and aligned in such a way that they are aligned with one another, for example specifically in such a way that an extension of a longitudinal axis of the connection connector 100 is parallel to an extension of a longitudinal axis of the connection connector 400 or coincides therewith.

In order to be able to compensate for a possible offset between the aforementioned pipe segments which are each connected to the measuring transducer—for example in such a way that the longitudinal axes of the two pipe segments in extension are displaced parallel to one another or also skewed and/or in such a way as to be able to compensate within the measuring transducer for a distance between the pipe segments greater than a distance between the connector ends 100+, 400+ corresponding to an installation length of the measuring transducer—or in order to prevent such an offset of the pipe segments from causing such forces and/or torques or mechanical stresses within the measuring transducer that can deform the at least one fluid line 200 to an impermissibly high degree, adversely affecting specifically the measurement accuracy of the measuring device, in the measuring transducer according to the invention, at least the connection connector 100 has in a region located between its connector end 100+ and its connector end 100# forming the first housing end 1000+, thus outside the protection housing 1000, a metal compensator 110. The metal compensator 110 serves in particular to configure the connection connector 100 to react to a (tensile) force acting in the direction of the longitudinal axis thereof in the region of the metal compensator 110 defined with a (longitudinal) expansion which is greater than a (longitudinal) expansion with which the connection connector 100 reacts in the region of the connector end 100+ and/or in the region of the connector end 100 # to said (tensile) force in each case. Alternatively or in addition, the metal compensator 110 can also be used to configure the connection connector 100 to react to a (transverse) force, which acts transversely to the longitudinal axis thereof, to cause a bending of the connection connector 100—for example taking the form of a straight bending and/or a transverse force bending—or a bending moment at the connector end 100+ in the region of the metal compensator with a curvature which is greater than a curvature with which the connection connector 100 reacts in the region of its connector end 100+ and/or in the region of its connector end 100 # to said (transverse) force or said bending moment. The aforementioned region of the connection connector 100 or the metal compensator 110 provided therein can accordingly be directly adjacent to the housing end 1000+, for example, or, as also shown schematically in FIG. 1, can be at a distance not only from the connector end 100+ but also from the housing end 1000+. Depending on the application or depending on the type of offset to be compensated, the metal compensator 110 can be designed, for example, as a corrugated tube compensator, as a lens compensator or, for example, also as an axial compensator.

According to a further embodiment of the invention, the metal compensator 110 has at least one recess, for example running along a circular and/or self-enclosed circumferential line, which recess can be formed, for example, as a bead recessed towards the lumen of the connection connector or, as also indicated in FIG. 1, as a bead which protrudes with respect to the lumen of the connection connector. In addition, the metal compensator can be designed as an integral component of the connection connector 100, for example in such a way that the aforementioned at least one recess is formed directly within the wall of the connection connector 100, for example, specifically rolled or stamped therein.

Alternatively or in addition, the metal compensator 110 can be designed in sections as a metal bellows, specifically as a ring-shaped cylinder made of metal with an inner diameter varying in a corrugated manner in the direction of the longitudinal axis and an outer diameter equivalently varying in a corrugated manner, for example in such a way that the wall of the connection connector 110 has two or more, in particular identically shaped, recesses arranged one behind the other in the flow direction and/or in that the wall of the connection connector 100 is corrugated at least in sections or in that the connection connector 100 has an internal diameter varying in a corrugated manner in the direction of the longitudinal axis and an outer diameter equivalently varying in a corrugated manner.

In order to further improve the compensation of the above-described offset between the pipe segments to be connected to the measuring transducer which can already be achieved by means of the metal compensator 110, it is also possible, as shown schematically in FIG. 2, for the connection connector 400 to have a metal compensator 410, for example also structurally identical to the metal compensator 110, located in a region between its first connector end 400+ and its second connector end 400 #, which forms the second housing end 1000 #. Alternatively, however, it is possible that the second connection connector also does not have a metal compensator, for example in order to keep a pressure loss, which is provoked by the measuring transducer as a whole in the flowing measured substance, as low as possible. In this case, it can also be advantageous to incorporate or use the measuring device in the pipe in such a way that the connection connector 100 is arranged on the inlet side with respect to a flow direction of the measured substance allowed to flow through the measuring transducer.

The invention claimed is:

1. A measuring device for measuring at least one measurement variable of a fluid measured substance conducted in a pipe, which measuring device comprises:
   a measuring transducer configured to generate at least one measurement signal that corresponds to the at least one measurement variable; and
   a measuring device electronic unit, which is electrically connected to the measuring transducer and configured to process the at least one measurement signal, wherein the measuring transducer comprises:
   a transducer protection housing;
   a first connection connector including a lumen encased by a wall made of metal and extending from a first flow opening located in a first connector end of the first connection connector to a second flow opening located in a second connector end of said first connection connector;
   a second connection connector including a lumen encased by a wall and extending from a first flow opening located in a first connector end of the second connection connector to a second flow opening located in a second connector end of said second connection connector; and
   a first fluid line comprising a lumen encased by a wall and extending from a first flow opening located in a first line end of the first fluid line to a second flow opening located in a second line end of said first fluid line, wherein the first fluid line is connected both at its first line end to the second line end of the first connection connector and at the second line end thereof to the second line end of the second connection connector, wherein said transducer protection housing comprises a cavity encased by a wall within which the first fluid line is placed, wherein a first housing end of the protection housing is formed by means of the first connection connector and a second housing end of the transducer protection housing is formed by the second connection connector such that the protection housing has a side wall laterally bounding the cavity, at least in part, which is connected in a fixed manner both at the second line end of the first connection connector and also at the second line end of the second connection connector or is connected in a bonded manner therewith in each case, and wherein at least the first connection connector includes, in a region located between its first connector end and its second connector end, which forms the first housing end a metal compensator.

2. The measuring device according to claim 1, wherein the first connection connector is configured to react to a tensile force acting in the direction of a longitudinal axis of the first connection connector in the region of the metal compensator with a longitudinal extension which is greater than a longitudinal extension with which the connection connector reacts to said tensile force in the region of the first connector end and/or in the region of the second connector end, and/or wherein the first connection connector is configured to react to a transverse force in the region of the metal compensator acting transverse to the longitudinal axis that brings about a transverse force bending of the first connection connector with a curvature that is greater than a curvature with which the first connection connector reacts to said transverse force in the region of the first connector end and/or in the region of the second connector end.

3. The measuring device according to claim 1, wherein the metal compensator includes at least one recess.

4. The measuring device according to claim 1, wherein the metal compensator is formed by at least one recess extending along a circular and/or self-enclosed circumferential line.

5. The measuring device according to claim 1, wherein the metal compensator includes an integral component of the first connection connector.

6. The measuring device according claim 1, wherein the wall of the first connection connector for forming the metal compensator includes at least one recess.

7. The measuring device according to claim 6, wherein the wall of the first connection connector includes two or more recesses, which are arranged one behind the other in a flow direction of the measured substance.

8. The measuring device according to claim 1, wherein the metal compensator of the first connection connector is designed as a corrugated tube compensator.

9. The measuring device according to claim 1, wherein the metal compensator of the first connection connector is designed as a lens compensator.

10. The measuring device according to claim 1, wherein the metal compensator of the first connection connector is designed as an axial compensator.

11. The measuring device according to claim 1, wherein the second connection connector includes, in a region located between its first connector ends and its second connector ends forming the first housing end a second metal compensator.

12. The measuring device according to claim 1, wherein the second connection connector does not have a metal compensator.

13. The measuring device according to claim 1, wherein the measuring transducer is configured to be integrated in a piping system such that the second connector end of the first connection connector is connected to a pipe end of a first pipe segment of the piping system facing the measuring transducer and/or that the second connector end of the second connection connector is fluidically connected to a pipe end of a second pipe segment of the piping system facing the measuring transducer so as to form a fluid duct that extends from the first pipe segment to the second pipe segment.

14. The measuring device according to claim 1, wherein the first and second connection connectors are aligned with one another.

15. The measuring device according to claim 1, wherein the first fluid line is configured such that the measured substance flows therethrough and is enabled to vibrate during the process.

16. The measuring device according to claim 1, wherein the measuring device electronics are configured to feed an electrical driver signal into the measuring transducer.

17. The measuring device according to claim 1,
wherein the first fluid line, at least in sections, is curved; and/or
wherein the first fluid line is straight, at least in sections.

18. The measuring device according to claim 1, further comprising:
at least one second fluid line including a lumen extending from a first flow opening encased by a wall, which is located in a first line end of the second fluid line, to a second flow opening located in a second line end of said second fluid line,
wherein the second fluid line is connected at its first line end to the second line end of the first connection connector and at its second line end to the second line end of the second connection connector.

19. The measuring device according to claim 18, wherein the second fluid line is configured such that the measured substance flows therethrough simultaneously with the first fluid line and is enabled to vibrate simultaneously with the first fluid line.

20. The measuring device according to claim 1, further comprising:
at least one vibration exciter configured to excite or maintain mechanical vibrations, at least of the first fluid line.

21. The measuring device according to claim 20,
wherein the measuring device electronics are electrically coupled to the vibration exciter to feed electrical power into the vibration exciter via an electrical driver signal; and/or
wherein the vibration exciter is configured to convert electrical power fed by the measuring device electronics into mechanical power causing mechanical vibrations of at least the first fluid line.

22. The measuring device according to claim 1, further comprising:
at least one first sensor configured to generate at least one first measurement signal corresponding to a measurement variable of a fluid conducted in the fluid line system of at least one signal parameter dependent on said measurement variable, the signal parameter including a signal level dependent on said measurement variable, a signal frequency dependent on said measurement variable, and/or a phase angle dependent on said measurement variable.

23. The measuring device according to claim 22, wherein the measuring device electronics are electrically coupled to the first sensor and are configured to process the at least first measurement signal to determine said measured values for the at least one measurement variable using the first measurement signal.

24. The measuring device according to claim 23, further comprising:
at least one second sensor and/or a second sensor structurally identical to the first sensor, each configured for generating at least one second measurement signal corresponding to the measurement variable, wherein the measuring device electronics are electrically coupled to the second sensor and are configured to process the at least second measurement signal to determine said measured values for the at least one measurement variable using the first and second measurement signals.

25. A method of using a measuring device according to claim 1, the method comprising:
determining measured values for at least one measurement variable, including at least one of a mass flow rate, a mass flow, a volumetric flow rate, a volumetric flow rate, a density, a viscosity, and a temperature of a fluid measured substance conducted in a pipe wherein the first connection connector is arranged on the inlet side with respect to a flow direction of the measured substance, which flows through the measuring transducer, and/or wherein the measured substance is allowed to flow in a predetermined flow direction through the pipe and the measuring transducer incorporated in said pipe.

* * * * *